3,332,966
N,N'-DI-1-ANTHRAQUINONYL-4,6-DIHYDROXY-
ISOPHTHALAMIDES
William Lee Berry and Daniel Walter Thomas, Somerville, N.J., assignors to American Cyanamid Company, Stamford, Conn., a corporation of Maine
No Drawing. Filed Nov. 9, 1965, Ser. No. 507,045
6 Claims. (Cl. 260—368)

This invention relates to improved colored pigments having the general formula:

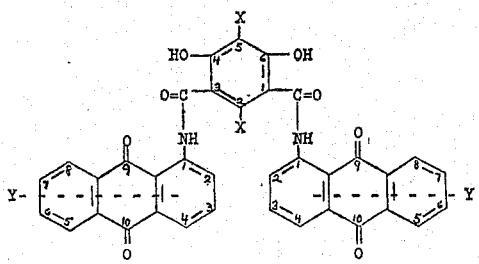

where X is selected from the group consisting of hydrogen, chlorine, bromine, and lower alkyl, not necessarily the same, and Y is selected from the group consisting of hydrogen, chlorine, bromine, and lower alkyl, at any unfilled position on a benzo ring of the anthraquinonyl radical, not necessarily the same on each anthraquinonyl radical.

In the past, various amides derived from 1-aminoanthraqiunone have been used as colorants, including both vat dyes and pigments.

British 748,233 (Badische) April 25, 1956, in Example 9, discloses N,N'-di-1-anthraquinonyl-4,6-dimethoxyisophthalamide. The compound is described as dyeing cotton in yellow shades from a red vat.

United States Patent No. 2,727,044, R. A. Pizzarello and A. S. Schneid, discloses a yellow pigment from the reaction of symmetrical o-phthalyl chloride and 1-aminoanthraquinone—presumably N,N'-di - 1 - anthraquinonyl phthalamide. The product is defined as having tristimulus values of X=0.6729; Y=0.7002 and Z=0.1644, a dominant wavelength of 576.4 brightness of 70.0 and purity of 71.5, under defined conditions.

United States Patent No. 2,833,789, V. A. Giambalvo and R. J. Alheim discloses 1-(3-chlorosalicyloylamido)-anthraquinone, and 1 - (3,5 - dichlorosalicyloylamido)-anthraquinone. This last could be named as N-1-anthraquinonyl-3,5-dichlorosalicylamide, using a name more consistent with other nomenclature herein.

Requirements for dyes and pigments are somewhat different as these are used in different fashions. To be useful as pigments in the various typical applications including paints, lacquers, printing inks, dope-dyed fibers, plastics, and related compositions there are certain important characteristics. The first is of course the hue, commonly called color. Preference as to hues vary with style. It is desired that the pigment have a high tinctorial strength, stability of such strength, and uniformity of strength under all conditions including exposure to light, and ageing, compatibility with various vehicles, resistance to bleeding, freedom from flocculation, and crystal stability.

In the past, various types of amides derived from 1-aminoanthraquinone have been proposed and used as colorants, in some instances as vat dyes and in other instances as pigments. In some instances, products have satisfied one or more of the requirements for use as pigments but failed in others; a low rating or failure in even one of the desired properties results in a decrease in commercial interest or commercial failure for such pigment. In addition, the need for new shades of color makes necessary a constant search for new pigment products.

It has now been found that the amides having the structure shown above are superior pigments of desirable shades of yellow with excellent light fastness, good color strength, good compatibility with vehicles and other components of color systems and excellent resistance to bleeding tendencies.

This superiority is rather particularly surprising because prior art related derivatives are only fair in certain respects and of limited interest commercially.

One method of preparation of our new pigments involves the reaction of a 4,6-dihydroxyisophthalic acid with a chlorinating agent, such as thionyl chloride ($SOCl_2$) to convert said acid to the corresponding di-acid chloride and subsequent treatment of this di-acid chloride with a 1-aminoanthraquinone. The di-acid chloride of the 4,6-dihydroxyisophthalic acid may be formed prior to the addition of the 1-aminoanthraquinone, and the di-acid chloride can be separated. Alternatively the formation of the di-acid chloride can occur in the presence of the 1-aminoanthraquinone so that the final reaction takes place directly. In the interest of reducing the number of isolation steps, it is usually preferable to form the final color compound before any isolation of a reaction product. The 4,6-dihydroxyisophthalic acid and the 1-aminoanthraquinone may each have additional substituents which substituents are carried through to the final product.

Among the 4,6-dihydroxyisophthalic acids which may be used to prepare the pigments of this invention are:

4,6-dihydroxyisophthalic acid
5-chloro-4,6-dihydroxyisophthalic acid
5-bromo-4,6-dihydroxyisophthalic acid
2,5-dichloro-4,6-dihydroxyisophthalic acid
2,5-dibromo-4,6-dihydroxyisophthalic acid
2-bromo-5-chloro-4,6-dihydroxyisophthalic acid
5-bromo-2-chloro-4,6-dihydroxyisophthalic acid
2-chloro-4,6-dihydroxyisophthalic acid
2-bromo-4,6-dihydroxyisophthalic acid
5-methyl-4,6-dihydroxyisophthalic acid
5-ethyl-4,6-dihydroxyisophthalic acid
2-methyl-4,6-dihydroxyisophthalic acid
2-ethyl-4,6-dihydroxyisophthalic acid
2-ethyl-5-methyl-4,6-dihydroxyisophthalic acid
5-ethyl-2-methyl-4,6-dihydroxyisophthalic acid
2,5-diethyl-4,6-dihydroxyisophthalic acid
2,5-dimethyl-4,6-dihydroxyisophthalic acid
2-chloro-5-ethyl-4,6-dihydroxyisophathalic acid
2-chloro-5-methyl-4,6-dihydroxyisophthalic acid
5-chloro-2-ethyl-4,6-dihydroxyisophthalic acid
5-chloro-2-methyl-4,6-dihydroxyisophthalic acid
2-bromo-5-ethyl-4,6-dihydroxyisophthalic acid
2-bromo-5-methyl-4,6-dihydroxyisophthalic acid
5-bromo-2-ethyl-4,6-dihydroxyisophthalic acid
5-bromo-2-methyl-4,6-dihydroxyisophthalic acid and mixtures thereof.

Among the 1-aminoanthraquinones which may be used in preparing the pigments of this invention are:

1-aminoanthraquinone
1-amino-2-chloroanthraquinone
1-amino-3-chloroanthraquinone
1-amino-4-chloroanthraquinone
1-amino-5-chloroanthraquinone
1-amino-6-chloroanthraquinone
1-amino-7-chloroanthraquinone
1-amino-8-chloroanthraquinone
1-amino-2-bromoanthraquinone
1-amino-3-bromoanthraquinone
1-amino-4-bromoanthraquinone
1-amino-5-bromoanthraquinone 1-amino-6-bromoanthraquinone
1-amino-7-bromoanthraquinone
1-amino-8-bromoanthraquinone
1-amino-2-methylanthraquinone
1-amino-3-methylanthraquinone
1-amino-4-methylanthraquinone
1-amino-5-methylanthraquinone
1-amino-6-methylanthraquinone
1-amino-7-methylanthraquinone
1-amino-8-methylanthraquinone
1-amino-2-ethylanthraquinone
1-amino-3-ethylanthraquinone
1-amino-4-ethylanthraquinone
1-amino-5-ethylanthraquinone
1-amino-6-ethylanthraquinone
1-amino-7-ethylanthraquinone
1-amino-8-ethylanthraquinone
1-amino-2-propylanthraquinone
1-amino-3-propylanthraquinone
1-amino-4-propylanthraquinone
1-amino-5-propylanthraquinone
1-amino-6-propylanthraquinone
1-amino-7-propylanthraquinone
1-amino-8-propylanthraquinone Among the preferred pigments of this invention are those from the amides derived from 1-aminoanthraquinone itself by reaction with the acid chlorides of 4,6-dihydroxyisophthalic acid or 5-chloro-4,6-dihydroxyisophthalic acid. Superior characteristics of the pigments of this invention over known compounds demonstrated below using pigments of these formulae are illustrative. Details of all the variants within the scope of this invention would unduly prolong this specification.

For conversion of the crude compounds to pigmentary products, conventional conditioning processes may be used. These include acid pasting, which is the drowning of an acid solution of the particular isophthalamide in water. The compound may be ground with or without grinding aid such as micropulverized salt, or it may be ball-milled, or treated in a fluid energy mill to reduce the particle size to pigmentary sizes, using processes which are obvious to those skilled in the art.

The new pigments may be used as a pure compound, or mixed with each other, or in solid solution with each other, or mixed with other pigments, including particularly titanium dioxide, or zinc oxide in lacquers, enamels, paints, printing inks, resin formulations, dope-dyeing as resin-bonded pigment for fabrics, and in other locations where a pigment having excellent light fastness, bleeding resistance, and a yellow color are desired.

As illustrative N,N'-di-1-anthraquinonyl-4,6-dihydroxyisophthalamide shows much better bleed resistance and much better lightfastness than a similar compound without the 4,6-dihydroxy substituents namely N,N'-di-1-anthraquinonylisophthalamide. Similarly, in tests against a related pigment having 4,6-dimethoxy substituents namely N,N'-di-1-anthraquinonyl-4,6-dimethoxyisophthalamide, the pigments of the present invention show superior pigment properties.

As illustrative of this invention the following examples show methods of preparing the pigments of this invention, as well as certain pigments of the prior art, which are shown by example as a basis for comparison whereby the advantages of the pigment of the present invention are most readily understood.

All parts are by weight unless otherwise stated.

EXAMPLE 1

*N,N'-di-1-anthraquinonyl-4,6-dihydroxy-isophthalamide*

A slurry is prepared of 20 parts of 4,6-dihydroxyisophthalic acid, 48 parts of 1-aminoanthraquinone and 700 parts by volume of nitrobenzene at room temperature. Hereto is added 29.5 parts of thionyl chloride, and with stirring, the slurry is heated to 145° C. rapidly and held between 145° and 150° C. for 3 hours. The product is filtered hot, washed with nitrobenzene at 120° C., then with hot 95% ethanol then acetone and dried. The resulting N,N'-di-1-anthraquinonyl - 4,6 - dihydroxyisophthalamide is amber in color with a yield of 50.0 parts, 82% of theoretical.

The product is conditioned by placing 11.7 parts of product, 100 parts of extra-fine flake salt, 317 parts microatomized salt and 65 parts by volume of ethylene glycol in a one-quarter water cooled iron dough mixer at 72 revolutions per minute and grinding for 7 hours. The mixture is discharged into and mixed with 3000 parts warm water with stirring. The suspension of the pigment is acidified by adding dilute sulphuric acid until acid to Congo Red indicator paper. The acidified mixture is stirred for 30 minutes at 60° C., the pigment separated by filtration, washed with hot water and dried. A light yellow pigmentary powder (11.0 parts) is obtained which X-ray analysis shows to be α(alpha) form having principal spacings at 14.2; 3.54 and 3.47 Angstroms. When made up as an enamel system the product was found to give a clear shade of yellow with excellent gloss, light fastness, and only a trace of overstriped bleed.

EXAMPLE 2

30 parts by weight of the crude product from Example 1 is recrystallized from 3000 parts by volume hot nitrobenzene, filtered, then washed with 95% ethanol and dried. The recrystallized material was subjected to salt grinding as described in Example 1. When isolated the pigment is found to be in β(beta) form characterized by X-ray analysis showing strong lines at 3.33; 9.52 and 6.10 Angstroms. In a typical test the product was found to have a high gloss, excellent light fastness and only a trace of overstriped bleed.

EXAMPLE 3

Example 1 is repeated except that the reactants are held at a temperature of 165° to 170° C. for 3 hours after which the product is isolated using the procedure of Example 1. The product is found to be in form β by X-ray analysis.

EXAMPLE 4

*Preparation of N,N'-di-1-anthraquinonyl-5-chloro-4,6-dihydroxyisophthalamide*

Using the procedure set forth in Example 1, 19.8 parts of 5-chloro-4,6-dihydroxyisophthalic acid, 42 parts 1-aminoanthraquinone, 800 parts by volume of nitrobenzene and 25 parts of thionyl chloride are heated to cause reaction. N,N-di-1-anthraquinonyl - 5 - chloro - 4,6 - dihydroxyisophthalamide is obtained in the form of a red shade yellow solid. A yield of 53.8 parts, 98.2% theoretical was obtained in one run.

25 parts of the product, 100 parts of extra-fine flake salt, 285 parts of microatomized salt and 70 parts by volume of ethylene glycol are ground in a dough mixer using the process set forth in Example 1. 23.1 parts of a yellow-shade pigment are obtained having a slightly redder shade of yellow than the product of Example 1, excellent strength, excellent gloss, excellent light fastness, and only a trace of overstriped bleed, when tested in enamel.

EXAMPLE 5

*Preparation of N,N'-di-1-anthraquinonylisophthalamide*

A slurry was prepared of 10 grams isophthalic acid 28.2 grams 1-aminoanthraquinone and 650 milliliters of nitrobenzene. To this slurry at room temperature was added 16 grams of thionyl chloride (SOCl₂); the mixture was rapidly heated to 144° C. and held between 144° to 150° C. for 2½ hours. The resultant product was filtered hot and washed with nitrobenzene at 100° C., then hot ethanol, and dried. The yield was 37.4 grams, 65% of theoretical.

15 grams of the above product were placed in a dough mixer with 100 grams of extra-fine flake salt 313 grams of microatomized salt and 65 milliliters of ethylene glycol. The mixture was salt ground for 7 hours at 72 revolutions per minute in a one-quart water cooled iron dough mixer. The mixture was then discharged into 4 liters of water heated to 35° C., and 50 milliliters of dilute sulfuric acid was added. The temperature was increased to For purpose of comparison only in certain tests the pigments were compared with 1-(3,5-dichlorosalicyloyl-amido)anthraquinone. This product is described in U.S. Patent No. 2,833,789. A commercially available grade of this pigment was used throughout. The following results were obtained.

For convenience, in the table, the abbreviation "AQ" is used for anthraquinone or anthraquinonyl.

TABLE

| | Color | Strengths by Hoover-Muller Pulldowns versus Standard | Fade-Ometer Lightfastness Hoover-Muller Test | Fade-Ometer Lightfastness Automotive Enamel Test (1-19 Tints) | Weather-Ometer Lightfastness Automotive Enamel Test (1-19 Tints) | Automotive Enamel Bleed Test |
|---|---|---|---|---|---|---|
| 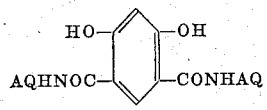 From Example 1 Form α (Alpha) | Green-yellow | 125 | Slight fade after 300 hrs. | Trace, slight fade after 300 hrs. | No change after 150 hrs. | Trace. |
| 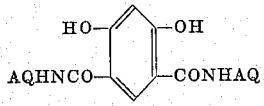 From Example 2 Form β (Beta) | do | 125 | do | Slight fade after 300 hrs. | do | Do. |
| 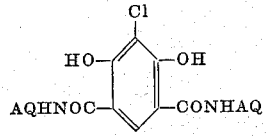 From Example 4 | Slight reddish-shade yellow. | 125 | do | 300 hrs. trace red fade. | do | Do. |
| 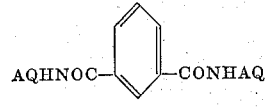 From Example 5 | Less green shade than Example 1. | 71 | Much fade after 100 hrs. | Moderate red fade after 300 hrs. | Moderate to considerable fade after 150 hrs. | Slight moderate. |
| 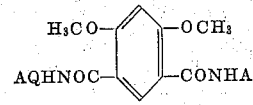 From Example 6 | More green shade than Example 1. | 100 | Complete fade after 100 hrs. | Considerable red fade after 100 hrs. | Complete fade after 150 hrs. | Trace slight |

60° C. and held at 60° C. for ½ hour. The slurry was filtered and washed salt and acid free. A pigment of N,N'-di-1-anthraquinonylisophthalamide, a yellow powder was obtained, in a yield of 14.2 grams.

EXAMPLE 6

*Preparation of N,N'-di-1-anthraquinonyl-4,6-dimethoxy-isophthalamide*

A slurry was prepared of 15 grams of 4,6-methoxy-isophthalic acid, 32 grams 1-aminoanthraquinone and 525 milliliters nitrobenzene. Thereto was added 19 grams of thionyl chloride. The mixture was heated to about 145° C. in about 15 minutes and held between about 145° C. and 150° C. for 2½ hours. The reaction mixture was filtered hot. The precipitate was washed with nitrobenzene at 110° C. then with alcohol and dried. A yield of 33.1 grams, 78.5% of theorectical was obtained.

A mixture of 15 grams of the product, 100 grams of extra-fine flake salt, 274 grams of microatomized salt and 72 milliliters of ethylene glycol was salt ground for 7 hours in a one-quart water cooled iron dough mixer at 72 revolutions per minute and isolated as described in Example 5. A yield was obtained of 13.7 grams of N,N'-di-1-anthraquinonyl-4,6-dimethoxyisophthalamide in pigmentary form.

The above table shows an evaluation of the pigment using a Hoover-Muller rubout test. The Hoover-Muller rubout test for the evaluations of the hue, strength, brightness of color, and quality of pigment was similar to the standard Hoover-Muller Rubout technique described in the American Society for Testing Materials, specification 52T, 1952 but slightly modified because of the availability of testing materials, as described below.

Base color pastes were first prepared by mixing 0.5 gram of pigment and 0.8 gram of vehicle (100 parts of No. 1 Transparent Litho Varnish and 4 parts 3½% cobalt paste dryer of the lineoleate type) and mulling 4 times, 50 revolutions each, at 150 pounds pressure.

Tint pastes are made by blending 100 mgs. of the base color paste with 10 grams of zinc oxide tinting white (70 parts New Jersey Company's Green Seal Oxide, 25 parts of No. 2 Transparent Litho Varnish and 1 part of Carter No. 6 Paste Dryer).

Drawdowns of the base pastes and of the tint paste are made on bond paper. A comparison is then made visually of the pigments with the pigment used as standard as to hue, and brightness or color quality, using the tint paste.

For a quantitative expression of relative pigment strength compared with the pigment designated the stand successively weighed amounts of the base color pastes to be compared are blended with 10 grams of the zinc oxide tinting white, until by trial and error, the strength of the tinted reference standard is visually matched on the drawdown. The strength of the pigment relative to that of the standard is then determined using the weight in milligrams of the base color paste required to be blended with the tinting white to match the reference standard. The percent relative strength figure is equal to the milligrams of base color paste used in the standard (100 mg.) divided by the milligrams of test paste necessary for matching the strength of the standard times 100.

The print tone drawdowns of the base pastes are also compared visually as to hue, strength and color quality.

For lightfastness determination, 0.1 g. of base color paste and 2.0 g. of TiO₂ vehicle (500 parts rutile TiO₂ typified by Unitane ® OR342, 240 parts Carter's 2 Transparent Varnish and 20 parts of cobalt drier of Linoleate type) are blended and drawn down on bond paper. The drawdowns are then exposed in a Fade-Ometer unit and observed to note the exposure in hours before appreciable fade or break (color change).

*Evaluation of pigment in an automotive enamel formulation, test for enamel bleed and lightfastness*

The enamel is prepared using a procedure consisting of the following steps:
(1) Preparation of a color base enamel
(2) Preparation of a white enamel
(3) Mixing the appropriate amounts of the above two enamels
(4) Dilution of the mixed enamel with solvent to adjust viscosity
(5) Metal panels are sprayed with the enamel and baked. These panels are used for lightfastness tests.

The details follow:

(1) *Color base enamel preparation.*—The following is placed in a one-quart ball mill:

| | Grams |
|---|---|
| ⅛" steel balls | 300 |
| Colored pigment | 3.125 |
| Vehicle described below | 43.9 |

The resulting mixture is milled for 24 hours and strained through a coarse paint strainer.

A vehicle is made by mixing:

| | Grams |
|---|---|
| Alkyd type resin (50% solution in butanol and xylene e.g. Rezyl 94–5) | 330 |
| Melamine cross linking resin (55% in xylene, e.g. Cymel 248-8) | 154.56 |
| Xylene | 75.68 |
| Butanol | 34.72 |
| Butyl cellosolve | 5.52 |

(2) *White enamel preparation.*—The following is weighed into a 1 gallon ball mill half full of ceramic balls.

| | Grams |
|---|---|
| Rutile TiO₂ (E.g. Unitane OR 640) | 436.8 |
| Alkyd type resin (50% solution in butanol and xylene e.g. Rezyl 94–5) | 1044.0 |
| Melamine cross linking resin (55% in xylene, e.g. Cymel 248-8) | 490.4 |
| Xylene | 88.4 |
| Butanol | 30.4 |
| Butyl cellosolve | 22.4 |

The mixture is milled 24 hours and strained through a coarse paint strainer.

(3) *Mixing procedure.*—The desired tinted enamel is made by mixing the following ratios. The mixing may be done conveniently on a paint shaker. Percentage refers to the weight of colored pigment divided by the weight of total pigment.

| | 1% (1–99) | 2% (1–49) | 5% (1–19) | 10% (1–9) |
|---|---|---|---|---|
| Color base, g. | 1 | 2 | 3 | 6 |
| White base, g. | 32.4 | 32.1 | 18.3 | 17.6 |

(4) *Dilution for spraying panels.*—For spraying enamels, each enamel from step 3 is diluted with a mixture of 25 parts butanol and 75 parts xylene to give a viscosity of 20 seconds in a number 4 Ford cup.

(5) *Spraying and baking.*—Panels may be sprayed with any conventional spray gun. Air pressure of 50 p.s.i. is used. The panels should be cleaned and either primed or roughened with steel wool before spraying. The sprayed panels are baked at 150° C. for 30 minutes.

The panels are used for the lightfastness tests.

For lightfastness, the panels or pull downs are exposed in a FadeOmeter or WeatherOmeter and observed to note the exposure in hours before fading or color change (break).

Degree of pigment bleed or bleed resistance is determined by use of a white enamel overstripe, as follows:

The color base enamel as prepared above is pulled down on a metal sheet using a doctor blade set to leave a film 0.005 inch thick. This is baked at 150° C. for 30 minutes. Then, the white enamel as prepared above is poured over the lower portion of the color drawdown and drawn down with a doctor blade set to leave a 0.008 inch film. The enamel is again baked at 150° C. for 30 minutes. The degree of bleed is determined by examining the amount of color which appears in the white overstripe, having bled through from the under layer.

Variations from the above tests are used by different test laboratories. As long as each pigment in the test series is treated exactly the same, the comparisons are meaningful.

We claim:
1. A bis-anthraquinonyl color compound represented by the formula:

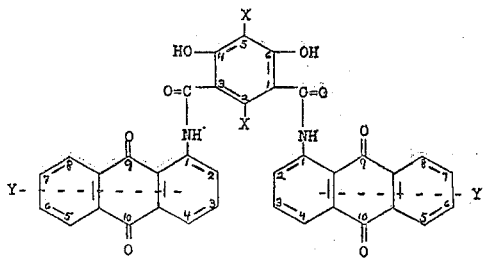

where each X is independently selected from the group consisting of hydrogen, chlorine, bromine, and lower alkyl, and each Y is independently selected from the group consisting of hydrogen, chlorine, bromine, and lower alkyl, at any unfilled position on a benzo ring of the anthraquinonly radical.

2. The compound of claim 1 in which each X and each Y is hydrogen and which is: N,N'-di-1-anthraquinonyl-4,6-dihydroxyisophthalamide.

3. The compound of claim 2 in the alpha-crystalline pigmentary form being characterized by having pigmentary size, and characteristics principal X-ray lines at 14.2, 3.54 and 3.47 Angstroms.

4. The compound of claim 2 in the beta-crystalline pigmentary form being characterized by having pigmentary size, and characteristic principal X-ray lines at 3.33, 9.52, and 6.10 Angstroms.

5. The compound of claim 1 in which each X and each Y is chosen such that the compound is N,N'-di-1-anthraquinonyl-5-chloro-4,6-dihydroxyisophthalamide.

6. The compound of claim 1 in which each X and each Y is chosen such that the compound is N,N'-di-1-anthraquinonyl-5-bromo-4,6-dihydroxyisophthalamide.

(References on following page)

References Cited

UNITED STATES PATENTS 1,911,714  5/1933  Roesch _____ 260—368

FOREIGN PATENTS 748,233  4/1959  Great Britain.

OTHER REFERENCES

Lubs, H. A.: The Chemistry of Synthetic Dyes and Pigments, New York, Hafner Publishing Co., pages 670–671.

LORRAINE A. WEINBERGER, *Primary Examiner.*

HAROLD C. WEGNER, *Assistant Examiner.*